March 11, 1969     H. E. SMITH     3,431,792
CONTROL MEANS FOR HYDROSTATIC TRANSMISSION
Filed Dec. 6, 1967     Sheet _1_ of 4

INVENTOR
Hugh Edward Smith
By Nathan N. Kraus
Frank H. Marks Att'ys

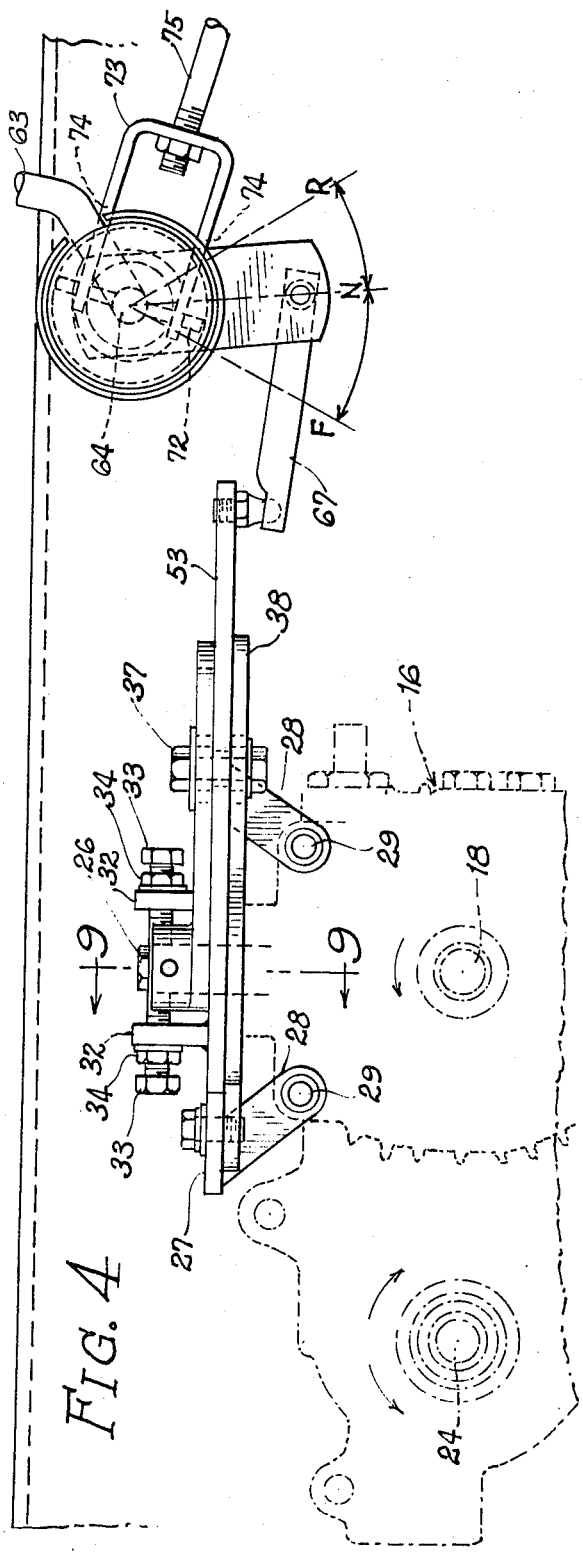
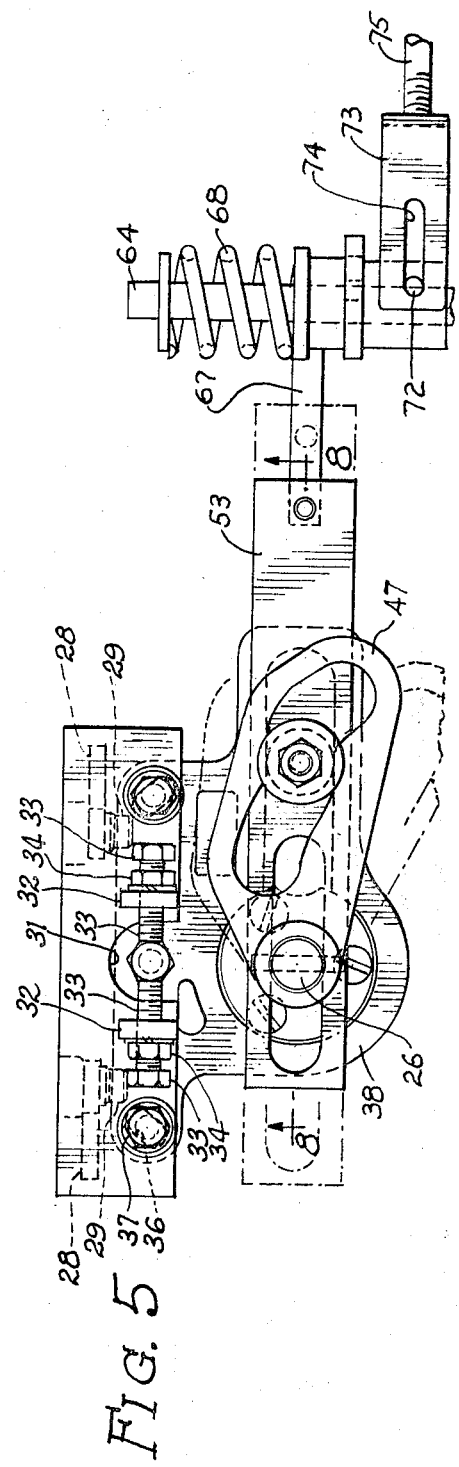

United States Patent Office 3,431,792
Patented Mar. 11, 1969

3,431,792
CONTROL MEANS FOR HYDROSTATIC
TRANSMISSION
Hugh Edward Smith, Kankakee, Ill., assignor to Roper
Corporation, a corporation of Delaware
Filed Dec. 6, 1967, Ser. No. 688,533
U.S. Cl. 74—481           10 Claims
Int. Cl. G05g 11/00

ABSTRACT OF THE DISCLOSURE

A means for controlling the disposition of the swash plate of a hydrostatic transmission unit to control the operation of the unit. Said means includes a guide plate adjustably mounted on the transmission housing, a control bar carrying a cam roller and arranged to be moved longitudinally over the guide plate, and a cam plate fixed to the shaft of the swash plate and having a cam track engaged by the cam roller. The control bar is connected to a control lever which effects movement of the control bar thereby to effect rocking of the swash plate shaft. A clutch pedal is operatively connected to the control lever and when the clutch pedal is depressed the control lever is automatically moved to neutral position to render the transmission unit inoperative.

---

This invention relates to control means for variable speed hydrostatic transmissions.

More particularly, this invention relates to means for accurately controlling the angular disposition of the swash plate of a hydrostatic transmission which determines the speed and direction of rotation of the power take-off shaft.

One of the objects of this invention is the provision of improved control means for a hydrostatic transmission which affords a high degree of accuracy of adjustment for different speeds and the accurate maintenance of such adjustments in operation.

Another object of this invention is the provision of control means of the foregoing character which is adjustable to a zero or null point in relation to the vehicle on which the transmission is installed, thereby obviating the effect of dimensional variations which may be present in the frames of different vehicles.

Still a further object of this invention is the provision of means for automatically returning the swash plate to neutral position when the engine or prime mover is declutched from the transmission.

Other and further objects and advantages of this invention will become apparent from the following description when the same is considered in connection with the accompanying drawings in which:

FIG. 4 is a side elevational veiw showing the complete control means, in solid lines and the hydrostatic transmission, in broken lines;

FIG. 5 is a top plan view of the structure illustrated in FIG. 4 and showing the parts disposed in neutral position;

Figure 1:
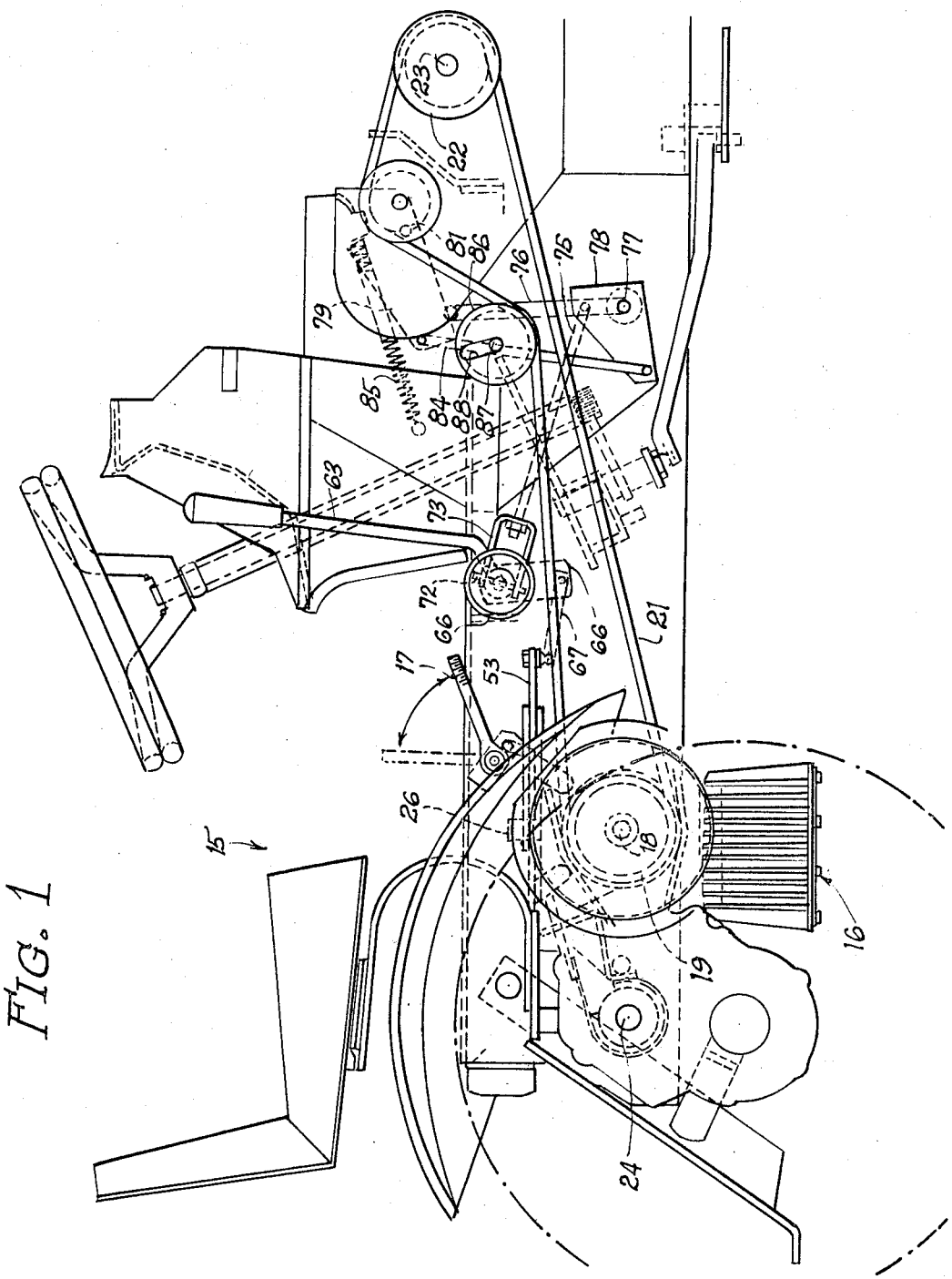
FIG. 1 is a fragmentary side elevational view of a riding type tractor incorporating a hydrostatic transmission and control means embodying my invention.

Referring to the drawings, particularly FIG. 1, my invention is shown applied to a riding type garden tractor 15 which incorporates a hydrostatic transmission 16 of conventional construction, one such transmission being identified as a Hydro-Gear transmission manufactured by the Sundstrand Corporation of Rockford, Ill. The transmission 15 includes a variable volume reversible swash plate-type pump and the control means of my invention is operative to control the disposition of the swash plate of the pump to control the amount and direction of oil flow to the hydraulic motor of the transmission to determine the speed and direction of the output shaft of the motor. Suitable braking means operatively connected to a foot lever 17 are provided on the tractor.

Since the transmission unit per se is conventional and does not form part of the present invention, only those portions of the unit, specifically the driving, power take-off and control shafts which project through the housing of the unit, will be identified.

Referring to FIGS. 1 and 4, the transmission unit 16 includes a drive shaft 18 on which is mounted a driven pulley 19 operatively connected by means of a belt 21 to a driving pulley 22 mounted on a jack shaft 23 operatively connected to the gasoline engine, not shown, of the tractor. The transmission of power from the driving pulley 22 is effected by means of a belt tightening arrangement hereinafter to be explained. The power take-off shaft of the transmisison unit is indicated by the numeral 24. In the present instance, the swash plate control shaft 26 is vertically disposed and extends above the top of the transmission housing as seen clearly in FIG. 4.

The control means, in accordance with my invention, comprises a mounting bracket formed of a rectangular plate 27 to which are welded a pair of angularly inclined arms 28, in depending relation to the plate. The lower ends of the arms are pierced, each receiving a bolt 29 which is threaded into the transmission housing 16. The plate 27 is provided with a generally semicircular cut-out 31, medially thereof, and welded to the plate on each side of the cut-out is a pair of lugs 32 each of which is drilled and tapped to receive an adjusting screw 33 provided with a lock nut 34. The plate 27 is further provided with a pair of elongated slots 36, each adapted to receive a bolt 37, as will be hereinafter explained.

Figure 3:
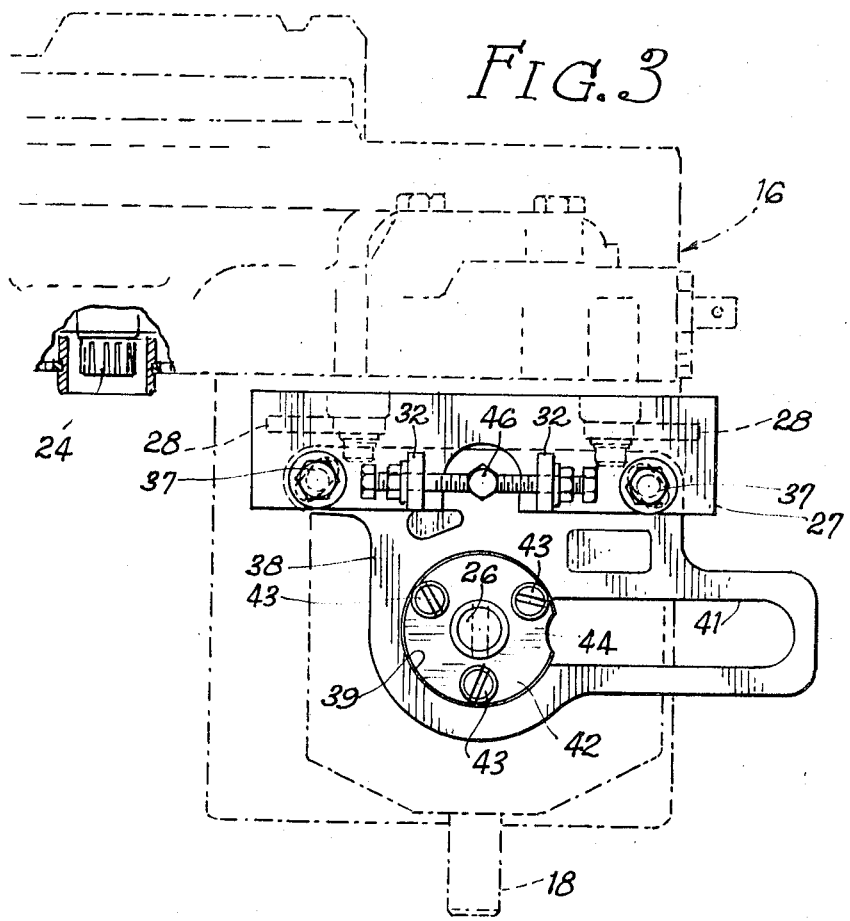
FIG. 3 is a top plan view, on an enlarged scale, showing certain parts of the control means in solid lines, with the hydrostatic transmission being shown in broken lines.

A guide plate 38 shaped substantially as illustrated in FIG. 3 is provided with a pair of tapped holes which are located substantially in registration with the elongated slots 36. Referring to FIG. 4 it will be seen that the guide plate 38 is adapted to be adjustably secured to the underside of the bracket plate 27 by means of the pair of bolts 37 which pass through the slots 36 and engage the tapped holes. The guide plate 38 is provided with a circular opening 39 which connects with an elongated slotted opening 41. A generally circular trunnion plate 42 is provided with a central opening to accommodate the swash plate control shaft 26 of the transmission unit and is also provided with three spaced counter-bored holes to receive bolts 43 which fixedly secure the trunnion plate 42 to the housing of the transmission unit. As seen clearly in FIG. 3, the trunnion plate 42 is received within the circular opening 39 of the guide plate, which is rockable relative to the trunnion plate for purposes of adjustment. A portion of the peripheral edge of the trunnion plate is cut away as at 44 to afford clearance for other cooperating parts, as hereinafter will be made clear.

The guide plate 38 is provided with a tapped hole to receive a bolt provided with an enlarged hexagonal head 46. As seen clearly in FIG. 5, the bolt is disposed substantially centrally of the cut-out 31 and is adapted to be engaged on opposite sides by the adjusting screws 33. Said screws acting against the head 46 afford means for making a micrometer adjustment of the guide plate 38 relative to the support bracket 27 so as to compensate for variations in dimensional tolerances in the transmission housing. It will be understood that such adjustment for a null point is effected after the bolts 37 have been first loosened and that after an adjustment has been made said bolts are tightened to secure the parts in adjusted position.

Figure 6:
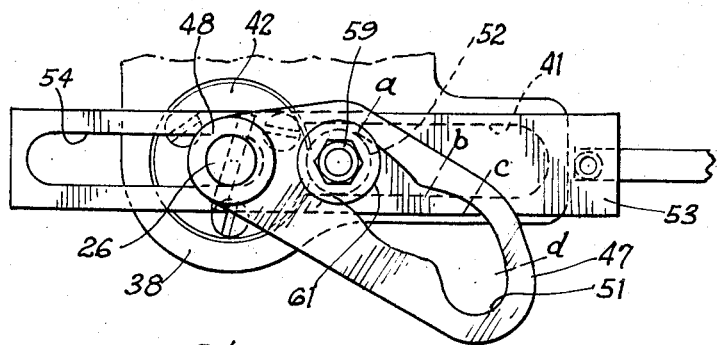
FIG. 6 is a fragmentary plan view similar to FIG. 5 but showing the parts adjusted for forward operation of the vehicle.
Figure 7:
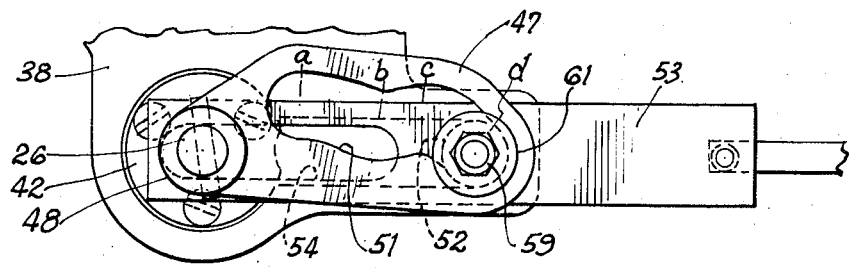
FIG. 7 is a view similar to FIG. 6 but showing the parts adjusted for reverse operation of the vehicle.
Figure 8:
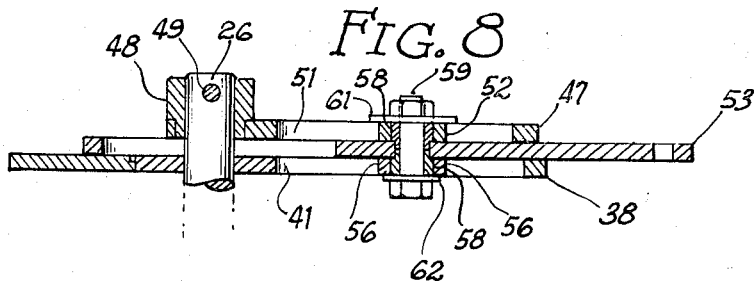
FIG. 8 is a cross-sectional view taken substantially on line 8—8 of FIG. 5.
Figure 9:
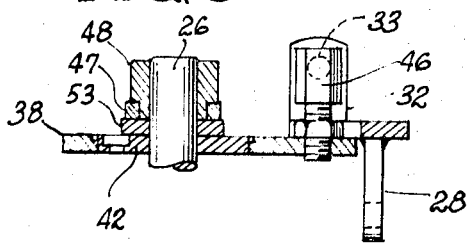
FIG. 9 is a cross-sectional view taken substantially on line 9—9 of FIG. 4.

A cam plate 47 shaped substantially as illustrated in FIGS. 5 and 8 includes a boss 48 provided with a bore to receive the end of the swash plate control shaft 26. The boss is provided with a drilled diametrical hole which when disposed in registration with a corresponding hole in the swash plate control shaft receives a pin 49 which locks the cam plate 47 to the shaft 26. The cam plate is provided with a cam track 51 shaped substantially as illustrated in FIGS. 5 through 7. A roller 52 hereinafter to be described is adapted to move within the cam track to effect rotation of the swash plate control shaft, as will be hereinafter explained.

A control bar 53 provided with an elongated slot 54 is disposed intermediate the guide track plate 38 and the cam plate 47 with the swash plate control shaft 26 extending through the slot 54. A pair of rollers 52 and 56 are coaxially arranged on opposite sides of the control bar 53 and are rotatably supported on bushings 58 carried on a bolt 59 which passes through the bushings and washers 61 and 62, as illustrated in FIG. 8. The lower roller 56 is arranged to travel within the slot 41 of the guide track plate 38 while the upper roller 52 is arranged to travel within the cam track 51 of the cam plate 47. Accordingly, the control bar may be caused to move only longitudinally in a straight line and in so moving different segments of the cam track 51 are caused to be engaged by the upper roller 52 thereby effecting rocking of the cam plate 47 and corresponding rocking of the swash plate control shaft 26.

Referring to FIGS. 5 through 8, it will be seen that the cam track 51 is generally S-shaped and is comprised of three segments, a forward operative segment extending substantially between lines $a$ and $b$, a neutral non-operative segment extending between lines $b$ and $c$ and a reverse operative segment extending between lines $c$ and $d$. While the opposing cam surfaces of segments $b-c$ and $c-d$ are parallel straight lines, the corresponding surfaces of segment $a-b$ are formed of parallel or concentric curves. This affords improved control of the speed of the tractor by making the change of speed increments directly proportional to the linear movement of the control bar 53. The neutral segment $b-c$ of the cam track 51 is of sufficient length such that fine adjustment of the control linkage mechanism is not required. A considerable movement of the control lever attached to the control bar 53 is required to move the transmission control means out of neutral position, either in a forward or reverse direction. This permits the control linkage mechanism to be set at the factory with considerable precision, since the cam segments are of such character as to permit close tolerance adjustment of the null point setting within the mechanism itself. Thus, any dimensional deviations in the tractor framework and control linkage mechanism do not affect the null point setting.

FIG. 5 shows the relationship of the parts in neutral or non-operative position. Here the roller 52 is in engagement with segment $b-c$ of cam track 51. FIG. 6 illustrates the relationship of the parts when the tractor is operating at maximum forward speed and in this relationship the roller 52 is disposed at the extreme left hand position of segment $a-b$ of cam track 51.

FIG. 7 illustrates the relationship of the parts when the tractor is operating in reverse direction and in this relationship the roller 52 is disposed at the extreme right hand end of segment $c-d$ of cam track 51.

Figure 2:
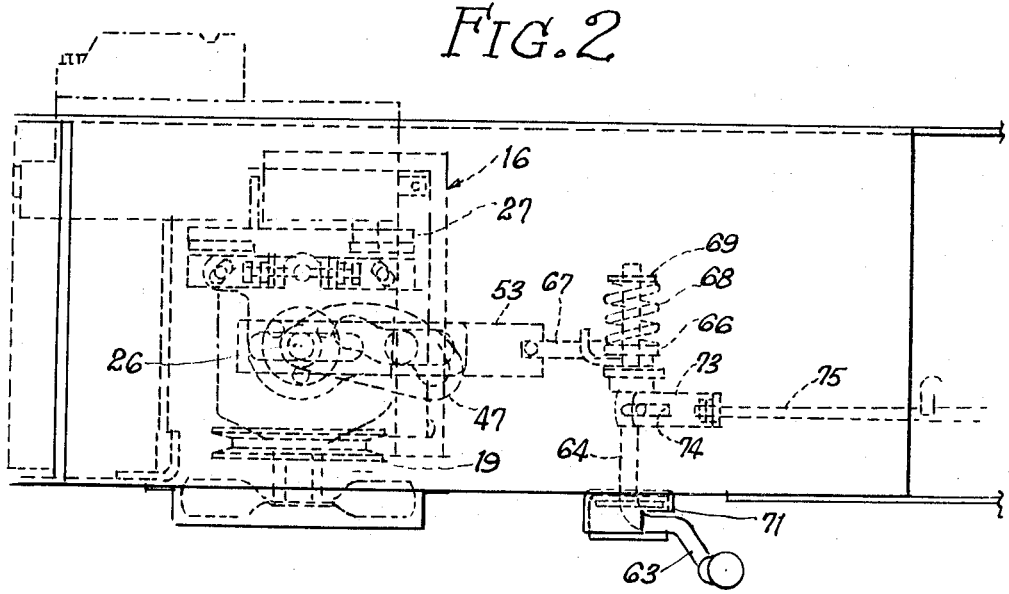
FIG. 2 is a fragmentary top plan view of the tractor showing the hydrostatic transmission and control means associated therewith.

Referring to FIGS. 1 and 2, a control lever 63, having a laterally extending integral leg 64 pivotally supported in the frame is provided with an arm 66 rigidly connected to the leg 64. A link 67 is pivotally connected at one end to the lever arm 66 and at the other end by means of a universal joint to the control bar 53. It will be apparent that movement of the control lever 63 about the axis of the leg 64 will effect linear movement of the control bar 53, in the manner hereinbefore described. A compression spring 68 is circumposed about the free end of the leg 64, the spring being abutted at one end by a washer 69 and at the other end by the frame of the tractor. The spring affords resistance to movement of the control lever 63 and serves to retain the lever in one of a series of detents provided along an edge of a quadrant plate 71 mounted on the frame of the tractor. Referring particularly to FIG. 4, the leg 64 is transversely drilled to receive a pin 72 of substantial length which extends transversely of the leg. A clevis 73 having opposed registering slots 74 cooperates with the pin with the opposite ends of the pin extending through said slots. A rod 75 is connected to the clevis.

A clutch pedal 76 is rigidly connected to a shaft 77 rotatably supported in the frame of the tractor. A crank plate 78 is fixed to the shaft 77 and one end of the rod 75 is pivotally secured to the crank plate 78. A second crank plate 79 is pivotally supported as at 81 and carries a pulley 82 over which is trained the drive belt 21. A link 84 connects the crank plates 78 and 79 and a spring 85 hooked to the frame and to the crank plate 79 serves to bias the crank plate in a counterclockwise direction, as viewed in FIG. 1. This maintains the belt 21 in taut operating condition.

An idler pulley 86 carried on a shaft 87 the ends of which are received in registering slots 88 provided in parallel brackets, not shown, serves to effect a change in the direction of the run of the belt 21 to provide clearance so as to avoid interference of the belt with the forward body portion of the tractor. It will be understood that shaft 87 will assume different positions within the slots 88 according to whether the drive belt 21 is in slack or taut condition.

It will be seen that the belt tightening arrangement or clutch is inter-related with the control lever 63 so that when the clutch pedal 76 is depressed the control lever 63 is automatically moved from an operative forward or reverse position to neutral position and, correspondingly, the control bar 53 similarly is moved to neutral position, so that the hydrostatic transmission unit is rendered inoperative. When the clutch is in operative position, that is when the clutch pedal 76 is not depressed, the ends of pin 72 are disposed somewhere in the slots 74, intermediate the ends thereof. This is true whether the pin 72 is in neutral position, as illustrated in FIG. 4, or has been rocked by the control lever 63 to positions corresponding to forward and reverse operation of the transmission unit. In any event, the position of the clevis 73 is such that the pin 72 may be moved without interference within the slots 74 of the clevis 73. When the clutch pedal 76 is depressed the clevis 73 is caused to move to the right, as viewed in FIGS. 1 and 4 to a point where the extreme left ends of the slots 74 in clevis 73 are caused to engage one of the ends of pin 72 causing the pin to assume the position illustrated in FIG. 4 which corresponds to the neutral position of the transmission unit control. Thus, when the clutch pedal 76 is depressed by the operator as when starting the engine or at any other time, the transmission unit is automatically rendered inoperative and the control lever is returned to neutral position so that when the clutch pedal is released there is no sudden transmission of power to the drive wheels of the tractor which would cause the tractor inadvertently to lurch and throw the operator. Accordingly, the operator at his own convenience may then manipulate the control lever to effect forward or reverse movement of the tractor.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. In combination with a hydrostatic transmission unit having a swash plate and a shaft to control the disposition of said swash plate,
    (a) a guide plate adapted to be mounted on the transmission housing,
    (b) a control bar carrying a cam roller and arranged to be moved longitudinally relative to said guide plate,
    (c) a cam plate fixed to said shaft and having a cam track engaged by said roller,
    (d) a control lever operatively connected to said control bar to actuate the same to effect rocking of said shaft,
    (e) clutch operating means, and
    (f) means connecting said clutch operating means with said control lever and so constructed and arranged that when said clutch is rendered ineffective the control lever and control bar are automatically moved to neutral position to render the transmission unit inoperative.

2. The invention as defined in claim 1 in which the cam track is generally S-shaped and includes a segment having opposed camming surfaces constituting concentric curves.

3. The invention as defined in claim 1 in which the linear movement of said control bar is directly proportional to the rotational movement of said shaft.

4. The invention as defined in claim 1 in which the guide plate is adjustable relative to said transmission unit.

5. The invention as defined in claim 1 in which the means connecting the clutch operating means includes an element having a slot and a pin rigid with said control lever and engaged in said slot.

6. The invention as defined in claim 1 in which the means connecting the clutch operating means includes a rod having a clevis at one end, said clevis having registering slots, and a pin rigid with the supporting shaft of said control lever and having its ends engaged in respective slots of said clevis, said pin ends being engaged by respective ends of said slots.

7. The invention as defined in claim 1 including a mounting bracket adapted for attachment to the transmission housing and having means for adjustably securing the guide plate to said bracket.

8. In combination a hydrostatic transmission unit having a swash plate and a shaft to control the disposition of said swash plate,
    (a) a mounting bracket adapted for attachment to the transmission housing,
    (b) a guide plate adjustably secured to said mounting bracket with said shaft extending through said guide plate,
    (c) said guide plate having an elongated slot in alignment with said shaft,
    (d) a slidable control bar having an elongated slot and superposed on said guide plate with said shaft passing through the slot of said control bar,
    (e) a cam plate fixed to said shaft and superimposed over said control bar, said cam plate having a cam track,
    (f) said control bar carrying a pair of co-axially arranged upper and lower rollers disposed respectively on opposite sides of said control bar, the lower roller being received in the slot of said guide plate and the upper roller being received in said cam track, and
    (g) a control lever operatively connected to said control bar to move said bar longitudinally whereby to effect rocking of said shaft and said swash plate.

9. The invention as defined in claim 8 including clutch operating means and means connecting such clutch operating means with said control lever, said connecting means being so constructed and arranged that when said clutch operating means is moved to inoperative position the control lever and control bar are automatically moved to neutral position to render the transmission unit inoperative.

10. The invention as defined in claim 9 in which the means connecting the clutch operating means includes a rod having a clevis at one end, said clevis having registering slots, and a pin rigid with the supporting shaft of said control lever and having its ends engaged in respective slots in said clevis, said pin ends being engageable by respective ends of said slots.

References Cited

UNITED STATES PATENTS 2,767,594  10/1956  Du Shane _____ 74—480 XR
3,354,981  11/1967  Swanson et al. ____ 74—481 XR FRED C. MATTERN, JR., *Primary Examiner.*

F. D. SHOEMAKER, *Assistant Examiner.*